(12) United States Patent
Simha et al.

(10) Patent No.: US 6,476,810 B1
(45) Date of Patent: Nov. 5, 2002

(54) METHOD AND APPARATUS FOR GENERATING A HISTOGRAM OF A VOLUME DATA SET

(75) Inventors: Vikram Simha, Lexington; Charidimos E. Gasparakis, Acton; Kenneth W. Correll, Lancaster, all of MA (US)

(73) Assignee: TeraRecon, Inc., San Mateo, CA (US)

( * ) Notice: Subject to any disclaimer, the term of this patent is extended or adjusted under 35 U.S.C. 154(b) by 0 days.

(21) Appl. No.: 09/353,680

(22) Filed: Jul. 15, 1999

(51) Int. Cl.[7] .............................................. G06T 17/00
(52) U.S. Cl. ..................... 345/424; 345/582; 345/419
(58) Field of Search ................... 345/424, 582, 345/419; 382/168–172, 506

(56) References Cited

U.S. PATENT DOCUMENTS 5,959,631 A * 9/1999 Knittel ....................... 345/420
6,304,266 B1 * 10/2001 Li .............................. 345/424
6,342,885 B1 * 1/2002 Knittel et al. .............. 345/424

* cited by examiner

*Primary Examiner*—Jeffery Brier
*Assistant Examiner*—Faranak Fouladi
(74) *Attorney, Agent, or Firm*—Dirk Brinkman

(57) ABSTRACT

A method generates a histogram of a volume data set in a rendering pipeline. The volume data set includes a plurality of samples stored in a memory. Each sample is partitioned in parallel into a plurality of field according to a plurality of format registers, there is one format register for each field. Entries of a plurality of tables are indexed in parallel with the plurality of fields, there is one entry indexed in each table by each field. The indexed entries are incremented to accumulate a histogram of the fields of the samples of the volume data set.

7 Claims, 14 Drawing Sheets

| Field Format Register 400 | | |
|---|---|---|
| Descriptor Entry | Description | |
| Control (403) | 0: | Scale field as unsigned repeating fraction in range of [0,...,1] |
| | 1: | Scale field as signed repeating fraction in range of [-1,...,+1] |
| | 2: | Scale field in least significant bits |
| | 3: | Scale field in most significant bits |
| Size (401) | Number of bits in field | |
| Position (402) | Starting position of field | |

FIG. 4

Lookup Table Format 600

| Bits | Field Name | Format | Description | |
|---|---|---|---|---|
| 31:24 | Alpha | field | Description of alpha field of LUT entry | 404 |
| 23:16 | Blue | field | Description of blue field of LUT entry | 403 |
| 15:8 | Green | field | Description of green field of LUT entry | 402 |
| 7:0 | Red | field | Description of red field of LUT entry | 401 |

FIG. 6

ALU

| Bits | Field Name | Description |
|---|---|---|
| 31:24 | AlphaOp | 0-15: Boolean operations |
| 23:16 | BlueOp | 16-31: Addition operations |
| 15:0 | GreenOp | 32-63: Multiplication operations |
| 7:0 | RedOp | 64-255: reserved |

FIG. 8

| Code | Name | Operation | Code | Name | Operation |
|---|---|---|---|---|---|
| 0 | clear | $O$ | 8 | nor | $\overline{A \vee B}$ |
| 1 | and | $A \wedge B$ | 9 | equiv | $\overline{A \oplus B}$ |
| 2 | and reverse | $A \wedge \overline{B}$ | 10 | invert | $\overline{B}$ |
| 3 | copy | $A$ | 11 | or_reverse | $A \vee \overline{B}$ |
| 4 | and inverted | $\overline{A} \wedge B$ | 12 | copy_inverted | $\overline{A}$ |
| 5 | noop | $B$ | 13 | or_inverter | $\overline{A} \vee B$ |
| 6 | xor | $A \oplus B$ | 14 | and | $\overline{A} \wedge \overline{B}$ |
| 7 | or | $A \vee B$ | 15 | set | $i$ |

| Code | Operation | Canonical Form | Code | Min Operation | Max Operation |
|---|---|---|---|---|---|
| 16 | $(A+B)_0^1$ | $min(A+B, 1)$ | 24 | $\overline{min(A, B)}$ | $\overline{max(\overline{A}, \overline{B})}$ |
| 17 | $(1+A-B)_0^1$ | $min(A+\overline{B}, 1)$ | 25 | $min(A, \overline{B})$ | $\overline{max(\overline{A}, B)}$ |
| 18 | $(1+B-A)_0^1$ | $min(\overline{A}+B, 1)$ | 26 | $min(\overline{A}, B)$ | $\overline{max(A, \overline{B})}$ |
| 19 | $(2-A-B)_0^1$ | $min(\overline{A}+\overline{B}, 1)$ | 27 | $min(\overline{A}, \overline{B})$ | $\overline{max(A, B)}$ |
| 20 | $(1-A-B)_0^1$ | $\overline{min(A+B, 1)}$ | 28 | $\overline{min(A, B)}$ | $max(\overline{A}, \overline{B})$ |
| 21 | $(B-A)_0^1$ | $\overline{min(A+\overline{B}, 1)}$ | 29 | $\overline{min(A, \overline{B})}$ | $max(\overline{A}, B)$ |
| 22 | $(A-B)_0^1$ | $\overline{min(\overline{A}+B, 1)}$ | 30 | $\overline{min(\overline{A}, B)}$ | $max(A, \overline{B})$ |
| 23 | $(A+B-1)_0^1$ | $\overline{min(\overline{A}+\overline{B}, 1)}$ | 31 | $\overline{min(\overline{A}, \overline{B})}$ | $max(A, B)$ |

FIG. 10

| Code | Operation | Code | Operation | Code | Operation | Code | Operation |
|---|---|---|---|---|---|---|---|
| 32 | $AB1'_0$ | 32 | $4AB1'_0$ | 24 | $AB1'_0$ | 24 | $4AB1'_0$ |
| 33 | $A\bar{B}1'_0$ | 33 | $A\bar{B}14'_0$ | 25 | $A\bar{B}1'_0$ | 25 | $A\bar{B}14'_0$ |
| 34 | $\bar{A}B1'_0$ | 34 | $\bar{4}AB1'_0$ | 26 | $\bar{A}B1'_0$ | 26 | $\bar{4}AB1'_0$ |
| 35 | $\bar{A}\bar{B}1'_0$ | 35 | $\bar{4}\bar{A}B1'_0$ | 27 | $\bar{A}\bar{B}1'_0$ | 27 | $\bar{4}\bar{A}B1'_0$ |
| 36 | $2AB1'_0$ | 36 | $8AB1'_0$ | 28 | $2AB1'_0$ | 28 | $8AB1'_0$ |
| 37 | $2A\bar{B}1'_0$ | 37 | $8A\bar{B}1'_0$ | 29 | $2A\bar{B}1'_0$ | 29 | $8A\bar{B}1'_0$ |
| 38 | $2\bar{A}B1'_0$ | 38 | $8\bar{A}B1'_0$ | 30 | $2\bar{A}B1'_0$ | 30 | $8\bar{A}B1'_0$ |
| 39 | $2\bar{A}\bar{B}1'_0$ | 39 | $8\bar{A}\bar{B}1'_0$ | 31 | $2\bar{A}\bar{B}1'_0$ | 31 | $8\bar{A}\bar{B}1'_0$ |

FIG. 11

METHOD AND APPARATUS FOR GENERATING A HISTOGRAM OF A VOLUME DATA SET

FIELD OF THE INVENTION

This invention relates generally to volume rendering, and more particularly, to histogramming in a rendering pipeline.

BACKGROUND OF THE INVENTION

Volume rendering is often used in computer graphics applications where three-dimensional data need to be visualized. For example, the volume data are scans of physical objects, or atmospheric, geophysical or other scientific models. With volume rendering, the internal structure, as well as the external surface of physical objects and models are visualized. Voxels are usually the fundamental data items used in volume rendering. A voxel is a data item that represents attributes of a particular three-dimensional portion of the object or model.

A voxel represents some particular intensity value of the object or model, such as physical parameters, e.g., density, elasticity, velocity, to name but a few, inferred by CT, MRI, PET, SPECT, ultrasound, or other scanning means. During rendering, the voxel values are converted to pixel color and opacity (RGBα) values which can be projected onto a two-dimensional image plane for viewing.

One frequently used technique during the rendering process is ray casting. A set of imaginary rays are "traced" through the array of voxels. For a particular viewing orientation, the rays are cast to the image plane in either a back-to-front, or a front-to-back order. The voxel values are sampled along the rays, and various techniques are known to reduce the sampled value to pixel values.

Rendering Pipeline

Volume rendering can be done by software or hardware. In one prior art hardware implementation, as shown in simplified form in FIG. 1, the hardware is arranged as a multi-stage pipeline 100, see U.S. patent application Ser. No. 09/190,643 "Fast Storage and Retrieval of Intermediate Values in a Real-Time Volume Rendering System," filed by Kappler et al. on Nov. 12, 1998. The input to the pipeline 100 is voxel stored in a voxel memory 101, and the output is pixels stored in a pixel memory or frame buffer 109. The stages can include decoding 110, interpolating 120, gradient estimating 130, classifying and shading 140, and compositing 150.

During operation of the pipeline 100, the decoder (address generator) 110 generates addresses of voxels stored in the voxel memory 101. The addresses are generated in a suitable order. Blocks of voxels are read from the memory, and presented to the pipeline for processing one at the time.

The interpolator 120 assigns values to sample points along the rays based upon voxel values in the neighborhood of the sample points. Typically, one can interpolate either voxel fields, or color-opacity fields using a predetermined interpolation mode, e.g., linearly, probabilistically, or nearest neighbor.

During gradient estimation 130, vectors ($G_{UVW}$) representing the direction and rate of change of voxel or sample values are estimated. Gradients with large magnitudes denote surfaces, or boundaries between, for example, types of material. The gradients are applied to shading and illumination functions to produce highlights that enhance the three-dimensional appearance.

During classification 140, color and opacity values are assigned to each sample point. During illumination 145, also known as shading, sample points are illuminated with highlights and shadows to produce a more realistic three-dimensional appearance. For example, Phong shading can be applied, see Phong, "Illumination for computer generated pictures," Communications of the ACM 18(6), pp. 49–59.

The output of the shading stage 145 is a stream of color and opacity values at sample points. This stream is fed to the compositing unit for accumulation into the pixel values of the rays. The pixel value of each ray must be accumulated one sample point at a time. Finally, after the color and opacity values of all of the sample points on an individual ray have been accumulated, the resulting pixel value of that ray is written to the pixel memory.

It will be appreciated that the order of gradient estimation, interpolation, and classification can be permuted. In fact, different prior art systems use different orders for the stages. However, in the prior art of ray-casting, the order of the stages in a particular system is fixed.

It is desired that the classification of voxels be generalized. In the prior art, voxel typically are single values or a fixed format dedicated to a specific application. Generalizing the format, will allow the pipeline to support a greater variety of applications.

SUMMARY OF THE INVENTION

A method generates a histogram of a volume data set in a rendering pipeline. The volume data set includes a plurality of samples stored in a memory. Each sample is partitioned in parallel into a plurality of field according to a plurality of format registers, there is one format register for each field.

Entries of a plurality of tables are indexed in parallel with the plurality of fields, there is one entry indexed in each table by each field. The indexed entries are incremented to accumulate a histogram of the fields of the samples of the volume data set.

The histograms can be shadow, depth, stress, distance, or gradient component maps.

BRIEF DESCRIPTION OF THE DRAWINGS

FIG. 4 is a block diagram of a field format register;

FIG. 6 is a block diagram of a look-up format register;

FIG. 8 is a block diagram of an ALU operation register;

FIGS. 9–11 are operations performed by the ALUs of FIG. 7;

DETAILED DESCRIPTION OF PREFERRED EMBODIMENTS

Figure 1:
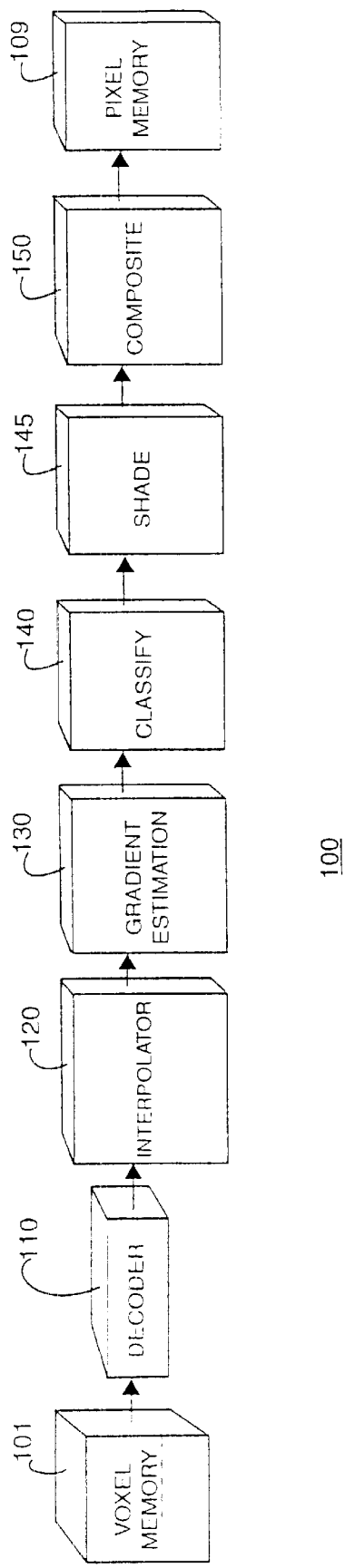
FIG. 1 is a block diagram of a prior art rendering pipeline.
Figure 2:
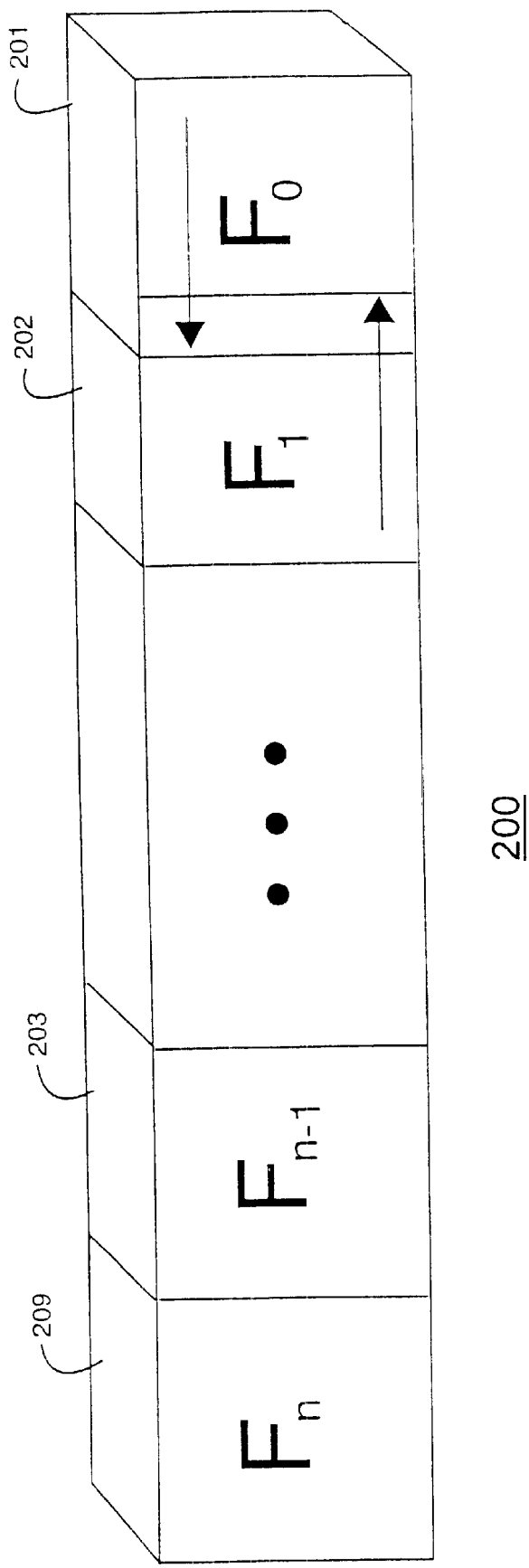
FIG. 2 is a block diagram of a multi-field voxel according to the invention.

As shown in FIG. 2, a raw sample, for example, a voxel 200, to be classified according to our invention, includes a plurality of fields ($F_1, \ldots, F_n$) 201–209. Each of the fields 201–209 is a subset of the bits in the sample. Each field is specified as an offset and width in the raw sample 200. Any of the fields can overlap as shown for fields $F_1$ and $F_2$. The fields can be enumerated in any order.

The fields describe different attributes of a represented three-dimensional object or model. For example, if the object is a human head, then the fields 201–209 can respectively store intensity values acquired from CT, MRI, PET, SPECT, and ultrasound scans. i.e., each voxel stores five different scan intensity values in a single voxel representation, one field for each intensity value.

Some fields can be category fields related to the way the volume is segmented, e.g., bone, soft tissue, ligaments, blood, etc. For physical models, the fields can store state variables used in scientific visualization, e.g., pressure, velocity, angular momentum, elasticity, density, temperature, and viscosity. For any volume data set, the fields can also store depth, 3D stencil, shadows, fog, voxelized and embedded synthetic or drawn objects.

In addition, any of the fields can be marked for specialized processing. For example, during shading, opacity-weighted color values are modulated to emphasize surface boundaries. For a multi-field sample 200 according to our invention, the application can specify which fields are used for gradient calculations. For each component of the gradient, the application can specify which of the voxel fields to use in order to determine any of the three gradient components.

For multi-field visualization, it is often desirable to interpolate fields within voxels separately. Furthermore, each field within the voxel can have a different interpolation applied, e.g., trilinear for intensity fields, and nearest neighbor interpolation for category fields, for example.

It is of interest for both software and hardware applications to be able to have a common framework for classifying all special cases of voxel formats in a uniform fashion. We provide a pipelined classifier, described in greater detail below, that can map voxel field values to RGBα values for any transfer function.

Voxel Formats

Figure 3:
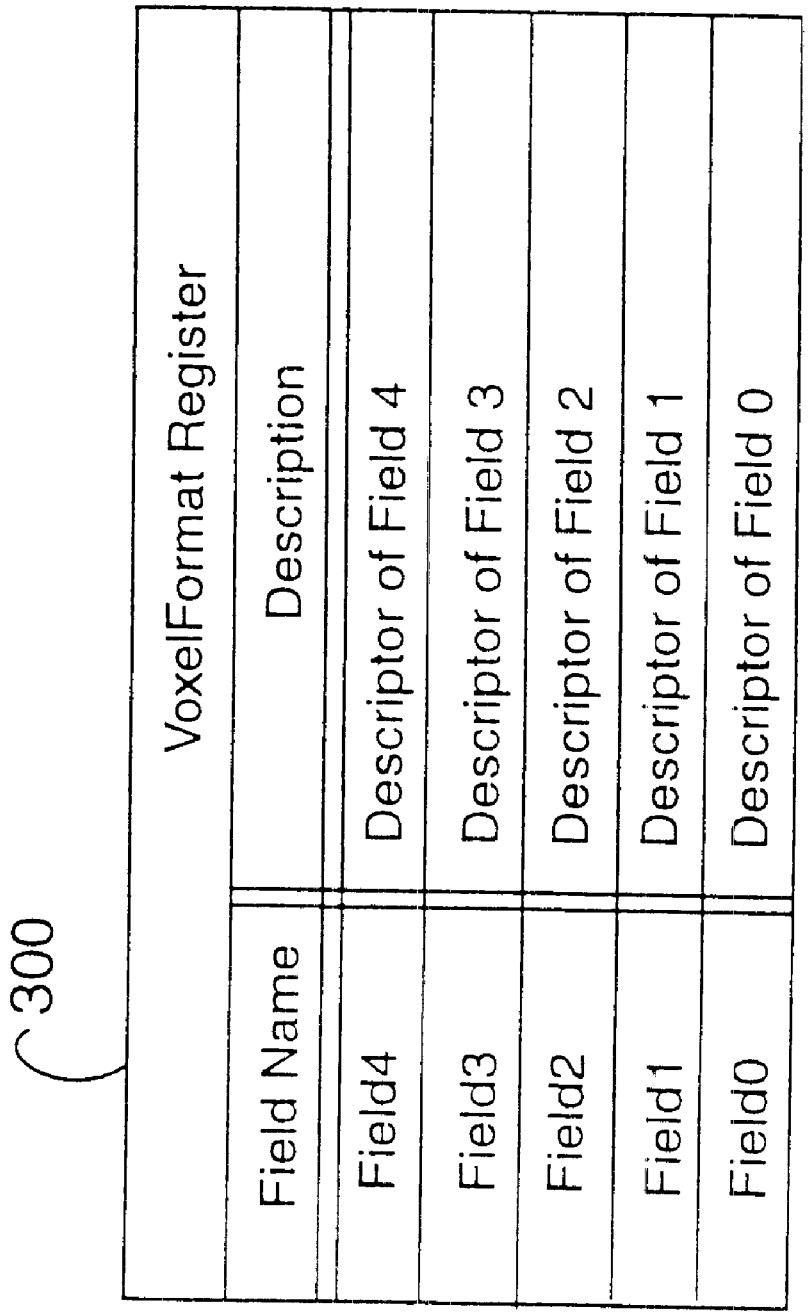
FIG. 3 is a block diagram of a voxel format register.

We have implemented a flexible protocol for specifying a wide range of input formats for raw samples. Voxels are stored as 8, 16, 32, or larger bit quantities in a voxel memory. Voxels are partitioned into fields, each of which may have a different meaning for a particular application. Fields may be 4, 8, 12, 16, or other number of bits in width In one embodiment, the fields are aligned on a four-bit boundary within the voxel. Fields larger or smaller than data paths can be scaled to fit the data paths, The format of a voxel is described in a VaxelFormat register 300, as shown in FIG. 3 for an example five field voxel.

Field Descriptors

Fields of voxels are defined by descriptors of in a Field-Format register 400, as shown in FIG. 4. This is an 8-bit descriptor defining the Size 401 of the field (in 4-bit nibbles), the Position of the field within its voxel, (also in 4-bit nibbles), and what to do when the field has a different size than from the size for its intended use in a data path. Control bits 403 define the numeric format of the field, and implicitly how a field may be expanded or shrunk ("scaled") to fit the data path to which it is connected: either by repeating fraction arithmetic or by adding or re-moving bits from either the most significant or least significant end.

Control=0: the field of the raw voxel is treated as an unsigned repeating fraction value in the range [0 ... 1]; the value of the field is scaled and rounded to be a repeating fraction of the number of bits of the target data path, and as nearly equal as possible to the original value. Repeating fractional numbers are described in greater detail below.

Control=1: the field of the raw voxel is treated as a signed repeating fraction value in the range [−1, ..., +1]. The value itself is converted as for control=0 above.

Control=2: the field of the raw voxel is expanded or truncated in its least significant bits to fit the data path. The most significant bits are preserved. This format is most useful when the magnitude of the number relative to its maximum is more important than the number of bits in its representation.

Control=3: the field of the raw voxel is treated as a binary integer and the field is expanded or truncated in its most significant bits to fit the data path. The least significant bits are preserved. This is useful when the value of the field, relative to zero is more important than the number of bits. For example, when category bits represent different types of tissue, e.g., when category bits represent different types of tissue, e.g., air=0, bone=1, muscle=2, etc.

Repeating Fraction Number Representation

Many graphics applications use a fixed width binary number to represent color, transparency, or other parameters that have fractional values in the range zero to one, inclusive.

Let R be the number of bits in the binary number and let V be the unsigned binary value stored in these bits. Then $F=V/(2^R-1)$ is a rational number in the range [0 ... 1]. That is, when V equals zero, F equals zero, and when V equals its largest possible value, $(2^R-1)$, F equals one. This representation is well known in the prior art. For example, the OpenGL Specification refers to it as a special kind of fixed point representation.

To clearly distinguish the representation described herein from ordinary fixed point representation, the term "repeating fractions" is used. The name term derives from the fact that expanding F into a fixed point binary fraction produces 0.VVVVVV..., that is, a binary fraction that repeats the R-bit value V infinitely to the right of the binary point.

Repeating fractions can be represented with more than R bits and can even be signed. In that case, R is the "repeating precision" of the number, since R defines the implicit scale factor $(2^R-1)$. This allows F to have values outside the range [0 ... 1]. In this case, the binary fixed point representation consists of an integer value followed by an R-bit infinitely repeating binary value. Repeating fractions with the same precision may be added and subtracted in the same way as ordinary integers.

Other arithmetic operations, including changing the repeating precision, may be performed by first computing F for each repeating fraction, performing normal arithmetic, and then multiplying the resulting value by $(2^R-1)$ for the repeating precision R of the result. More efficient forms exist for operations on repeating fractions. For example, doubling the repeating precision from R to 2R simply requires computing V+(V<<R).

Classification and Interpolation Order

Figure 5A:
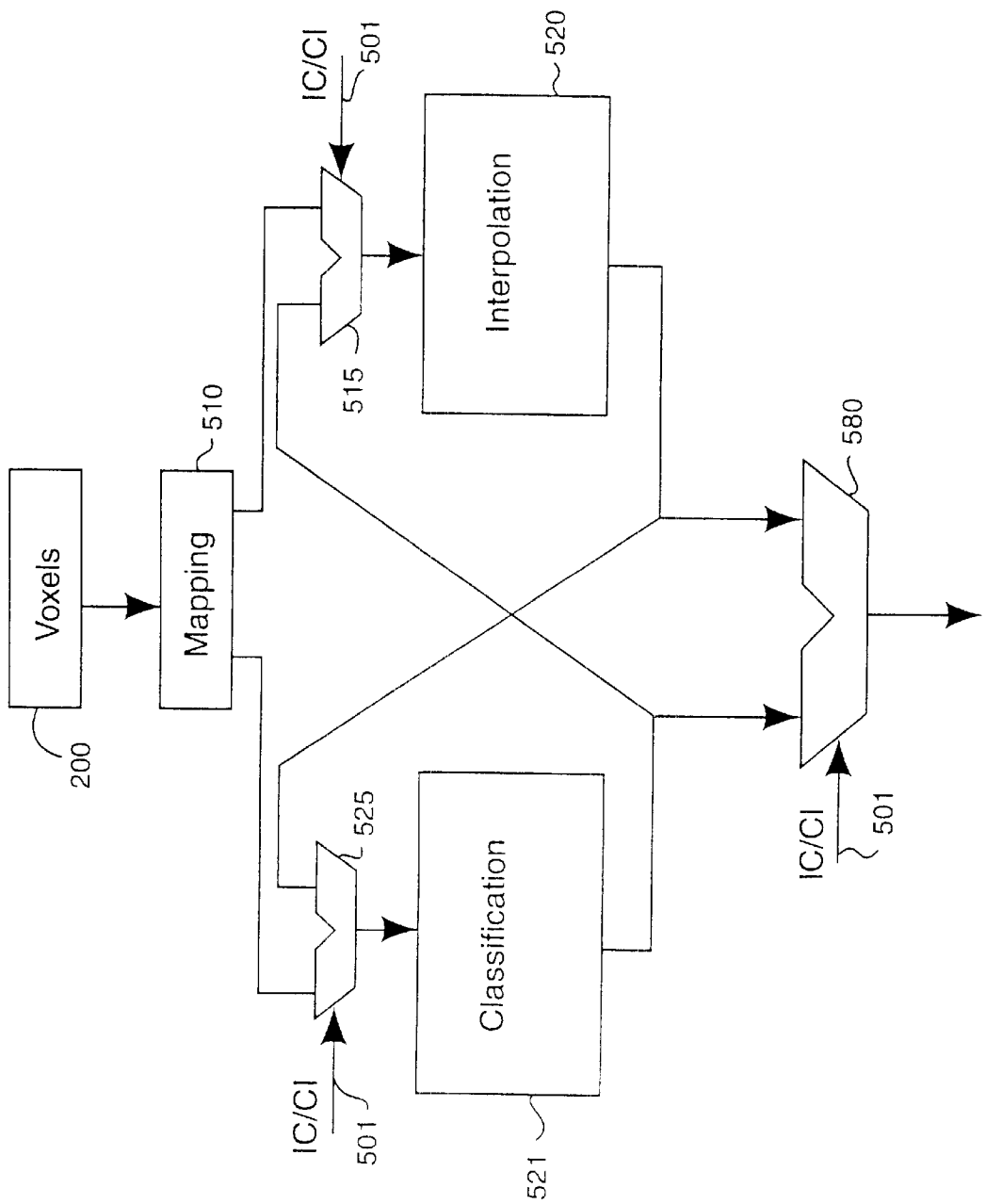
FIG. 5a is a block diagram of a configurable classification and interpolation stage of a rendering pipeline according to the invention.

As shown in FIG. 5a, the pipeline according to the present invention can perform interpolation 520 and classification 521 in either order, interpolation before classification (CI), and classification before interpolation (CI). The reason for two different processing orders is a follows.

Scanners acquire sampled data by making physical measurements which typically represent an integral over a small region of space. Adjacent voxels often represent the integrals of overlapping regions. In these cases, it is more accurate to interpolate voxels first, then classify the result. In particular, a voxel at a boundary of, say, two different tissues is likely to represent an average of the physical properties of each tissue. When interpolating, all we are doing is moving the points of average. To make this useful, the classification function should present a continuous transition from between the colors and opacities assigned to the two tissue types.

Sometimes, sampled data may be pre-segmented (manually or automatically) into distinct materials, e.g., bone, muscle, cartilage, etc. Given such data, it would be inappropriate to interpolate between two differently identified tissues to obtain a third tissue that is not really there. In these cases, it is better to classify the voxels first, then interpolate the resulting colors. This is not so much an average of the physical properties of adjacent tissue types, but rather a blend of the colors at their boundaries.

Therefore, two control signals, IC and CI 501, invoke these two modes, respectively. The control signals select inputs for multiplexers 515, 525, and 580. Each control signal causes a volume to be rendered according to the control signals. If the fields are first interpolated, then those fields which are not twelve bits wide are scaled to twelve bits according the Control bits 403 of their respective field descriptors 400. The results are then routed to the interpolators 520, which produce interpolated voxel fields.

It should be noted that in special cases IC/CI can be set to complete bypass either of the classification or interpolation stages. For example, a volume data set that is "preclassified" i.e., RGBα are already assigned to the voxel fields, does not need to pass through the classification stage, it is sufficient to only interpolate. Conversely, it may be desired to classify a volume data set without interpolation to obtain RGBα values.

Classification Stage

Figure 5B:
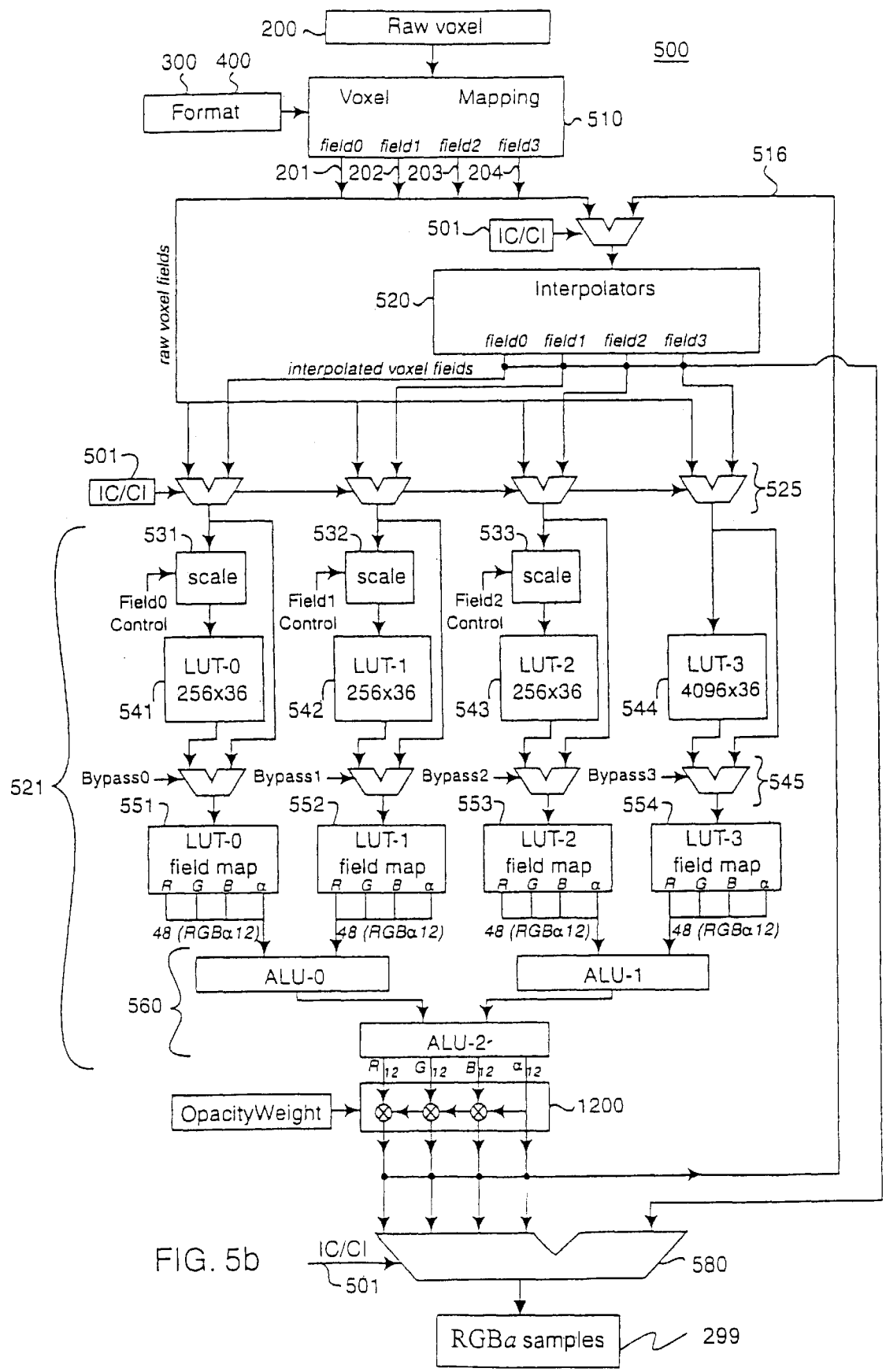
FIG. 5b is a detailed block diagram of the classification and interpolation stages.

FIG. 5b shows the classification and interpolation stages in greater detail. Typically, the input to the interpolation stage 520 and the classification stages 521 is raw voxels 200, and the output is opacity-weighted RGBα samples 299.

A voxel mapping unit 510 uses the format registers 300 and 400, as described above, to extract fields from the voxels. Both the classification stage and the interpolation stage, described in detail below, process the multiple fields independently and in parallel. That is, each stage can be considered to fork into, for example, four pipelines, one for each field.

The multiplexers 515, 525, and 580 select the order of processing through the interpolation and classification stages. Three scalers 531–533 are coupled to the mapping units and the interpolators by multiplexers 525. The scalers adjust the size of the extracted fields to fit the data paths. The output of the scalers are used to index look-up tables (LUT-0, . . . , LUT-3) 541–544. In a preferred embodiment, one 4096×36 and three 256×36 look-up tables are used.

In the present embodiment, there is a fixed relationship between fields and look-up tables in the classification stage. Field0 is used as an index to look-up values in LookupTable0 (a 256-entry table) 541, field1 is used as an index to look-up values in LookupTable1 (another 256-entry table) 542, field2 is used as an index to look-up values in LookupTable2 (a third 256-entry table) 543, and field3 is used as an index to look-up values in LookupTable3 (the 4K-entry table) 544. In the case that a field of 12 or more bits is applied to a 256entry look-up table, the field is scaled down to eight bits. The method of scaling is governed by the FieldControl bits 403, e.g., Field0.Control, Field1.Control, and Field2.Control, respectively, as shown in FIG. 5.

If fields 201–204 are first classified, then the fields are immediately converted to eight or twelve bits, and multiplexed directly to the corresponding look-up tables, i.e., Field0 201 to LookupTable0 541, Field1 202 to LookupTable1 542, Field2 203 to LookupTable2 543, all 256-entry tables, and Field3 204 to LookupTable3 (a 4096-entry table) 544.

The outputs of the look-up tables, via multiplexers 545, are processed by corresponding field mapping units 551–554 described in detail below. The output of the field mapping units are combined by a cascading network of arithmetic logic units (ALU) 560 to produce the opacity-weighted samples 299.

After classification, the results are routed by a path 516 to the multiplexer 515 at the top of the interpolators 520, and then on to the rest of the rendering pipeline.

Any look-up table may be bypassed under the control of the Bypass0–Bypass3 signals. Each Bypass signal is a two bit signal, and is associated with a particular field of the raw or interpolated voxel. When the Bypass signal is zero (00), classification proceeds normally by using the raw or interpolated voxel field as an index into the look-up table 541–544. If the Bypass signal is one (01), then the raw or interpolated voxel field is used in place of the looked up entry. If the Bypass signal is two (10), then the look-up table is used to gather a histogram of values of the raw or interpolated voxel field as described in greater detail below.

In the case that a field is bypassed, the raw or interpolated voxel field is expanded from its 12-bit internal representation to a 36-bit wide quantity by prepending the hexadecimal value 0×100000 to its high-order bits.

Look-up Table Format Registers

Entries in each look-up table are 36-bits wide in a preferred embodiment. The classification stage allows a flexible protocol for specifying a wide range of formats for look-up table entries, unlike the prior art. Look-up tables allow flexible classification schemes, including different levels of precision for different fields. Typically, the output of the look-up tables is RGB values, although other values, such as luminance can also be looked-up.

These formats are specified by the four LookupTableFormat registers 600 as shown in FIG. 6. Each format register defines the positions of the red, green, blue, and alpha fields 401–404 within a look-up table entry, using the same kinds of field descriptors as for voxel formats, see FIG. 4. The descriptors are applied in the LUT field map units 551–554 of FIG. 5.

For example, a typical table format of eight bits each of red, green, and blue, plus twelve bits of alpha could be expressed by the following:

Red.Position=0; Red.Size=1; Red.Control=0
Green.Position=2; Green.Size=1; Green.Control=0
Blue.Position=4; Blue.Size=1; Blue.Control=0
Alpha.Position=6; Alpha.Size=2; Alpha.Control=0

Note, although the fields of a look-up table entry are named after the primary colors, in fact, they may be used for other colors or purposes. However, the alpha transparency value is a distinguished field, and is used in the compositing stage for blending color values.

Note that each LookupTableFormat register 600 applies to the bypassed fields as well as to the result that is looked up. By this means, a bypassed value can be routed to one or more of the RGBα signals that the connect to the following ALUs 560. In addition, constant values zero and one can also be routed to one or more of the RGBα signals.

Combining Look-up Result

Before we describe how look-up results are combined by the arithmetic logic units 560 after look-up in tables 551–554, we first consider a special case, a transfer function for opacity correction as described by Lichtenbelt et al. in "Introduction to Volume Rendering," Hewlett-Packard Professional Books, Prentice-Hall, p. 89, 1998:

$$\alpha_i = O(I_i, |\Box_i|, \ldots, \ldots, \ldots),$$

where $O(\ldots)$ is the opacity transfer function, and $|\Box|$ is the local gradient magnitude. This function can be expanded to:

$$\alpha = \Sigma_{m,n} \alpha_{mn} * f_m(I) g_n(|\Box I|),$$

where $\Sigma$ stands for addition, and *indicates a product. This transfer function is a doubly infinite sum involving products of basis functions for each term.

The sum can be truncated according to the sampling frequency of the volume data set. However, even if finite, the expanded form of the sum needs to involve only a few terms to be useful.

In what follows, we proposed a fixed number of generalized "summands," which can be combined with arbitrary operations, logical or arithmetical. In general, voxel V 200 can be formulated as:

$$V = (F_0, F_1, \ldots, F_n),$$

where $F_0, \ldots, F_n$ are the multiple fields 201–209 of FIG. 2. A look-up table (LUT) $L_i$ acts on attribute values stored in each field $F_i$ to produce corresponding pixel values, for example, RGBα$_i$ values:

$$L_i: vRGB\alpha_i(v), \forall \epsilon F_i.$$

This notation indicates that each look-up table produces the partial RGBα contribution of a given voxel field. We now combine those contributions, using logical or arithmetic operations. We denote by "*ij" the operator that combines RGBα$_i$ with RGBα$_j$, for example:

$$RGB\alpha_i *_{ij} RGB\alpha_j \rightarrow RGB\alpha_{(ij)}$$

This means that the operator*$_{ij}$, in reality, is the tensor product of four operators, one for each of the four components of the RGBα value.

Figure 7:
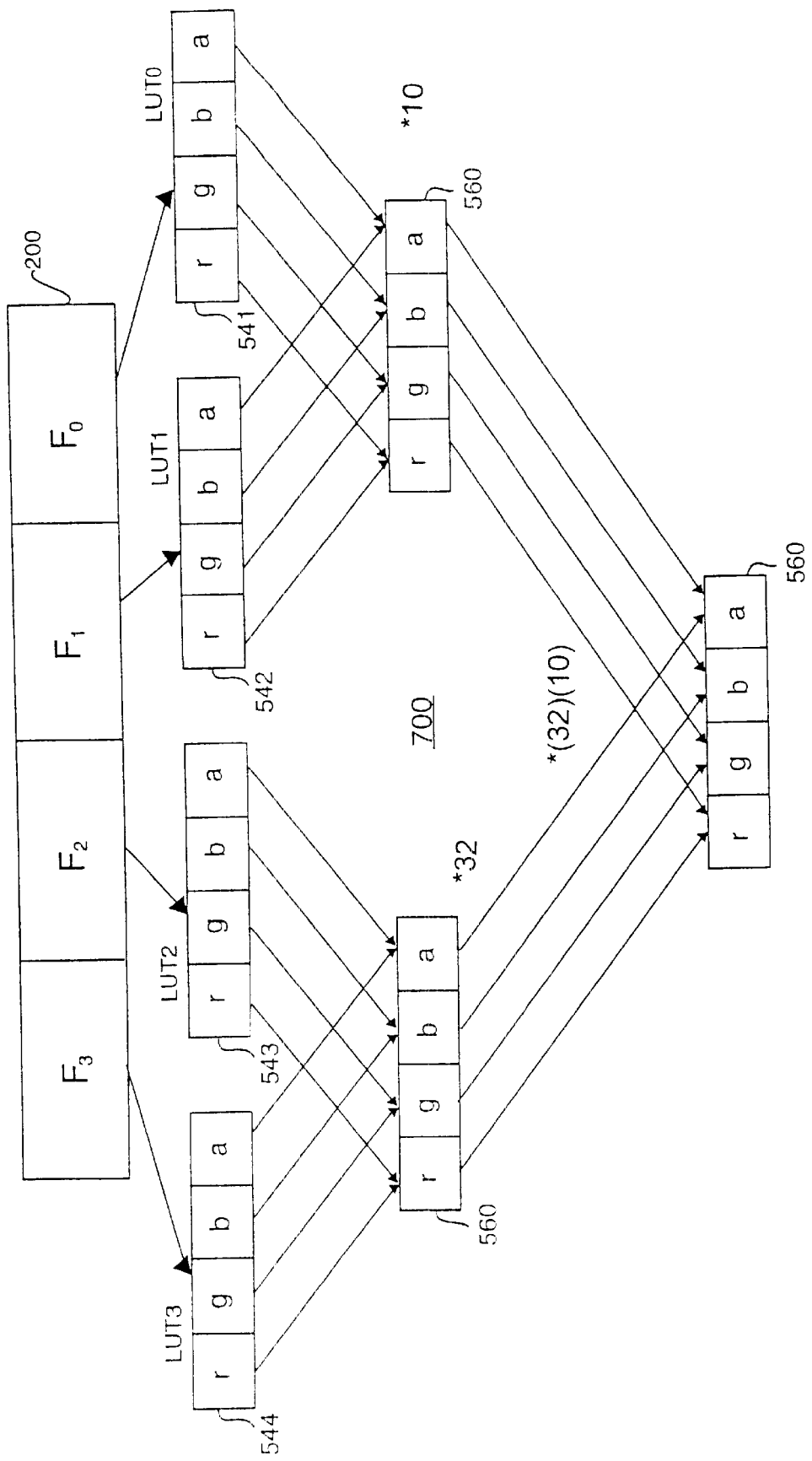
FIG. 7 is a block diagram of cascaded arithmetic logic units.

This iteratively defines a tree. Each node in the tree is the contraction of at least two parent nodes. A good compromise between full generality and realistic applications is achieved by using a fixed-grammar, variable width tree 700 of ALU's 560 as shown in FIG. 7, where the look-up tables (LUT0,..., LUT3) 541–544 are for the corresponding fields ($F_0, \ldots, F_3$), and the respective combinatorial operators are*$_{32}$,*$_{10}$, and *$_{(32)(10)}$, where the subscripts denote the order of combination of the fields. In other words, the tree of ALU's implements:

$$V = (F_3, F_2, F_1, F_0) \rightarrow (L_3(F_3) *_{(32)} L_2(F_2)) *_{(32)(10)} (L_1(F_1) *_{10} L_0(F_0))$$

As shown clearly in FIG. 7, the various "*" operators are composite operators, comprising four component-wise operations, one for each of the color-opacity channels. Useful operators, per RGBα channel, are logical (Boolean) operations, and arithmetic operations, such as, multiplication, multiplication of the complements with respect to one, addition, average, minimum, maximum, among others. Note, some of the operators, could be unitary operators, such as, negation, in which case the operator only applies to a single parent node.

As an advantage, we use a fixed grammar, i.e., a fixed number of nodes at fixed positions in the tree 700. Moreover, we provide the ability to "shuffle" voxel fields during decoding by the mapping unit 510. A field $F_i$ to be looked-up in LUT$_i$ is defined by on offset and width in the voxel 200. The offset and width can be set in registers as the voxel is decoded. The offset and width can be used to shift and mask the bits of the voxel to extract the appropriate field.

It should now be apparent that our fixed width grammar can accommodate most useful rendering cases. In the case of RGBα volumes, where each voxel is of the form (R, G, B, α), the look-up tables can be arbitrary functions, and all the "*" operators can be *$_{OR}$≡(OR $\hat{x}$ OR $\hat{x}$ OR $\hat{x}$ OR). Then for the color red, $$r \rightarrow L_3(r) = (f_3(r), 0, 0, 0),$$

and for the color green, $$g \rightarrow L_2(g) = (0, f_2(g), 0, 0),$$

and $$L_3(r) *_{OR} L_2(g) \equiv L_{32}(r, g) = (f_3(r), f_2(g), 0, 0).$$

Similarly, for blue $$b \rightarrow L_1(b) = (0, 0, f_1(b), 0),$$

and for opacity $$\alpha \rightarrow L_0(\alpha) = (0, 0, 0, f_0(\alpha)),$$

and $$L_1(b) *_{OR} L_0(\alpha) \equiv L_{10}(b, a) = (0, 0, f_1(b), f_0(\alpha)).$$

The final result is:

$$L_{32} *_{OR} L_{10} = (f_3(r), f_2(g), f_1(b), f_0(\alpha)).$$

Similarly, if one of the voxel fields is a segmentation field, it is possible to modify the voxel's RGBα assignment by a segmentation dependent rule. For concreteness, consider the following example.

Let (s,i) be a dual field, where s is a category index and i an intensity index. If:

$$L_1(s=1) = (1, 0, 0, 1), L_0(i) = (R, G, B, \alpha), *_{10} = \text{AND } \hat{x} \text{ SAND } \hat{x} \text{ SAND } \hat{x} \text{ OR}),$$

then $$L_1(s=1) *_{10} L_1(i) = (r, 0, 0, 1).$$

The result is that the voxels that belong to the category s=1 are made opaque, and only the red component of the voxel's classified intensity is retained. It should be clear that the possible operators one can use is practically unlimited.

Arithmetic Logic Units (ALUs)

Therefore, in order to generalize the transfer function, the outputs of the LUT field map units 551–554, whether they represent looked up entries or bypassed fields, are combined by the hierarchy of arithmetic-logical units (ALUs) 560, as shown in FIG. 5. The outputs of LUT-0 and LUT-1 are combined by ALU-0, the outputs of LUT-2 and LUT-3 are combined by ALU-1, and the outputs of ALU-0 and ALU-1 are combined by ALU-2.

Each ALU in FIG. 5 is, in fact, four independently controlled, 12-bit ALUs, one each for the red, green, blue, and alpha fields selected by the LUT field maps 551–554. Each field of the input of the ALU is processed independently. That is, there are no inter-field operations. The opcodes for each of the fields of each of the ALUs are specified in ALU registers 800, as shown in FIG. 8.

Each ALU is controlled by an 8-bit opcode specifying the following operations: Sixteen possible logical operations on two inputs, encoded into the first sixteen opcode values. Sixteen addition operations on two inputs. These implement the sum or difference, clamped to one. Either or both of the inputs and/or the result may be inverted; in repeating fraction arithmetic, this is equivalent to subtracting from one. Thirty-two multiplication operations on two inputs.

Let pqrst be the five low-order bits of the opcode and let A and B be the two inputs. Then:

$$\text{Result} = p \ XOR \ \text{clamp}(((t \ XOR \ A)*(s \ XOR \ B))<<(qr))$$

That is, conditionally complement A and B depending on the values of bits t and s, then multiply, then shift left by 0, 1, 2, or 3 bits as selected by bits qr, then round that result and clamp it to [0 ... 4095], and finally conditionally complement that result based on the value of bit p.

ALU Operations

As shown in FIG. 9, the opcodes support sixteen possible logical (Boolean) operations 900 on two inputs, encoded into the first sixteen opcode values. In FIGS. 9–11, the symbols with a bar above indicate the negative, e.g. $\overline{E}$ would mean 1–E. FIGS. 10 and 11 show possible arithmetic operations including addition, subtraction, minimum, maximum, multiplication, shifting, and complementing either the operands or shifted results.

In particular one can perform set-theory operations, such as, find the union of all segments belonging to categories $c_1$, $c_2$, and make their opacity zero, i.e., make those two segments invisible.

As examples of the use of arithmetical operators, consider the following operators, which can be useful in combining two different scans of the same object together:

$$A *_c B = \max\{A, B\}, \ A *_t B = 1-(1-A)(1-B).$$

One can use the $*_c$ operator for each color component, and the $*_t$ operator for the opacity:

$$RGB\alpha_1 \ (*_c, *_c, *_c, *_t) \ RGB\alpha_2.$$

In another example, a volume is combined with a shadow map of the same volume, when illuminated by arbitrary light sources. The multi-field voxel is then (s, i), where s now stands for the shadow value, which is the opacity accumulated at the voxel position, when the volume is illuminated by the light sources. Simple shadowing can be performed by:

$$c' = (1-s)*c.$$

In terms of the combiner 560, consider the operation:

$$*_{sh} = (x,x,x,x),$$

where "x" is the usual multiplication:

$$s \to L_1(s) = (1-s, 1-s, 1-s, 1),$$

and $$i \to L_0(i) = (R, G, B, \alpha),$$

and conclude that $$L_1(s) *_{sh} L_0(i) = ((1-s)R, (1-s)G, (1-s)B, \alpha).$$

If we also give the normal field magnitude data as an input, then we can use the classifier to further modulate the RGBα above by the edgeness value.

A further application where our classifier can be used is depth shading, where depth is considered as a generalization of the concept of shadow, and apply equations similar to the above.

Opacity Weighting

After the outputs of the look-up tables are combined by the ALUs, the resulting red, green, and blue values may be optionally multiplied by the alpha value to produce the opacity-weighted color values 299. This is important for properly illuminating and compositing color values. Also, correct interpolation of color (RGBα values) components requires that they be weighted for opacity when classification takes place before interpolation. This is to prevent voxels that have zero opacity from contributing to the sample's color.

Figure 12:
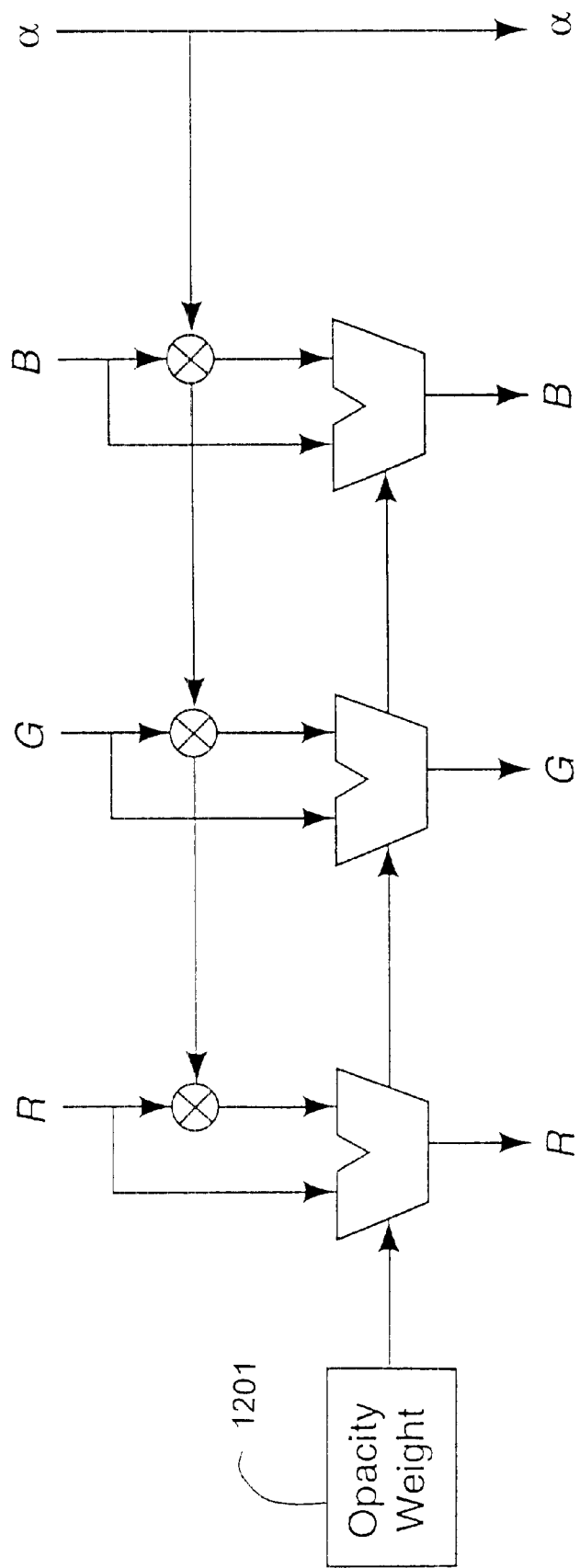
FIG. 12 is a circuit diagram of a unit for opacity weighting.

The opacity weighting function is shown in more detail in FIG. 12. When the OpacityWeight 1201 is zero, the red, green, and blue color fields of the output of the classification stage pass through unchanged. When the OpacityWeight is one, each of the red, green, and blue fields is multiplied by the alpha field.

Interpolation Stage

The interpolation stage 520, like the classification stage processes the multiple fields independently and in parallel. When the IC/CI signal 501 causes interpolation to precede classification, the fields of the raw voxel are independently interpolated, then used as indices to their corresponding tables. If however, the IC/CI signal causes classification to precede interpolation, then the red, green, blue, and alpha values are interpolated as four independent fields.

Interpolation function that can be used include trilinear, Lagrangian, nearest neighbor, etc. Any of these functions can be applied to any field during the parallel processing.

Histograms

Figure 13:
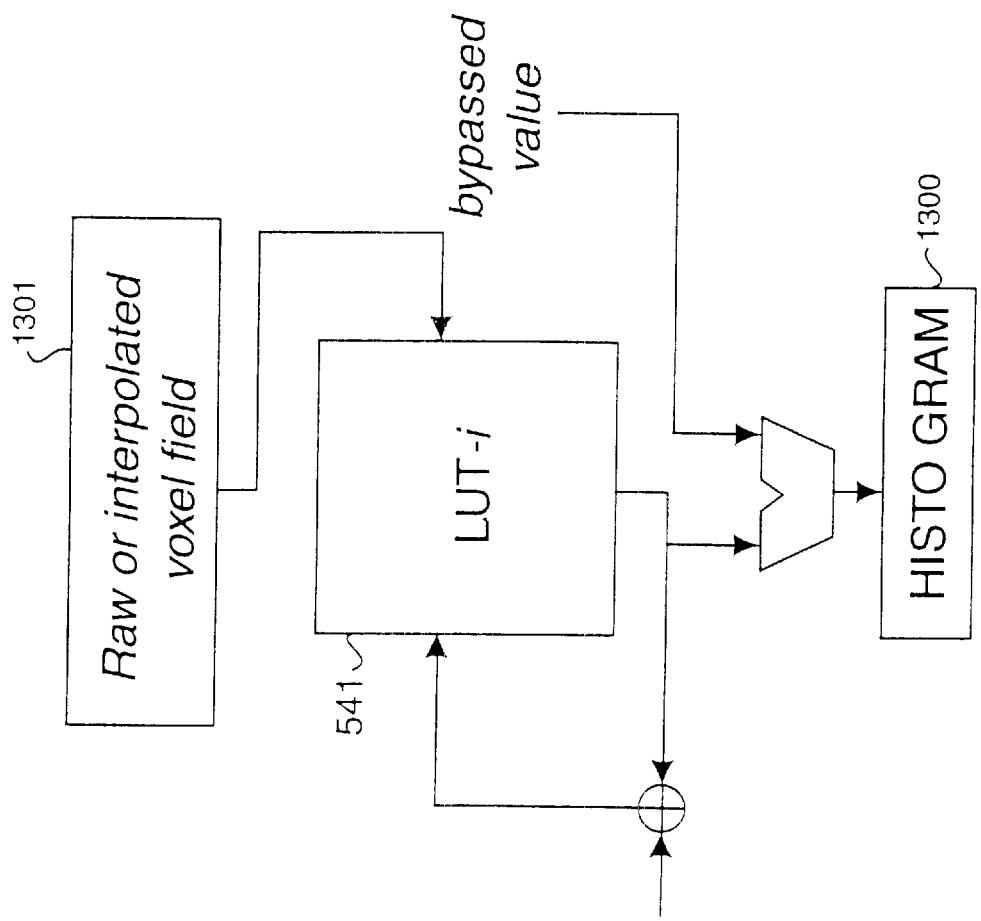
FIG. 13 is a block diagram of a histogramming unit.

As shown in FIG. 13, the classification look-up tables 541–544 can also be used for collecting histograms 1300 of raw or interpolated voxel fields 1301. In other words, the table can operate in two modes.

When classifying individual voxels, the look-up tables are preloaded with classification entries before a rendering pass. The value of each voxel field is used to index an entry of a corresponding table, and the value of the entry, typically a RGB value, is returned.

When classifying entire volume data sets, the entries in the look-up tables are all initialized to zero values. The value of each voxel field is used to index an entry of a corresponding table, and the entry is incremented. When all voxels have been classified, entries of the table essentially form a histogram of voxel values. By invoking the by-pass function, the tables can be read out. The histograms indicate relative frequency of different voxel values. The histograms can be used to better segment the volume data set.

It is to be understood that various other adaptations and modifications may be made within the spirit and scope of the invention. Therefore, it is the object of the appended claims to cover all such variations and modifications as come within the true spirit and scope of the invention.

We claim:

1. A method for generating a histogram of a volume data set in a rendering pipeline, the volume data set including a plurality of samples stored in a memory, comprising the steps of:

partitioning, in parallel, each sample into a plurality of fields according to a plurality of format registers, there is one format register for each field;

indexing, in parallel, entries of a plurality of tables with the plurality of fields, there is one entry indexed in each table by each field; and incrementing the indexed entries to accumulate a histogram of the fields of the samples of the volume data set.

2. The method of claim 1 wherein the entries in the tables are first initialized.

3. The method of claim 1 wherein the entries in the tables are read after all samples in the volume data have been processed.

4. The method of claim 1 wherein each table has a plurality of entries, and wherein the number of entries in a first table is different than the number of entries in a second table.

5. The method of claim 1 wherein the entries in the tables are first initialized with classification values, and the indexing immediately returns the corresponding classification value without incrementing the indexed entry to classify the sample.

6. An apparatus for generating a histogram of a volume data set in a rendering pipeline, the volume data set including a plurality of samples stored in a memory, comprising the steps of:

a plurality of format registers for partitioning, in parallel, each sample into a plurality of fields, there being one format register for each field;

a plurality of tables indexed, in parallel, with the plurality of fields; and means for incrementing the indexed entries to accumulate a histogram of the fields of the samples of the volume data set.

7. The apparatus of claim 1 wherein the entries in the tables are first initialized with classification values, and the indexing immediately returns the corresponding classification value without incrementing the indexed entry to classify the sample.

* * * * *

UNITED STATES PATENT AND TRADEMARK OFFICE
CERTIFICATE OF CORRECTION

PATENT NO. : 6,476,810 B1
DATED : November 5, 2002
INVENTOR(S) : Simha et al.

It is certified that error appears in the above-identified patent and that said Letters Patent is hereby corrected as shown below:

Column 11,
Lines 17 and 19, delete "is" and insert -- being --.

Column 12,
Line 12, insert after memory, -- the apparatus --.
Line 13, delete "the steps of".
Line 14, delete "for partitioning" and insert -- to partition --.

Signed and Sealed this

Tenth Day of February, 2004

JON W. DUDAS
*Acting Director of the United States Patent and Trademark Office*